(12) United States Patent
Chen et al.

(10) Patent No.: US 12,188,604 B2
(45) Date of Patent: Jan. 7, 2025

(54) GANTRY MOTION PLATFORM

(71) Applicant: NINGBO SHANGJIN AUTOMATION TECHNOLOGY CO., LTD., Ningbo (CN)

(72) Inventors: Wen Chen, Ningbo (CN); Zhi Tian, Ningbo (CN); Zhelai Wang, Ningbo (CN); Chengjun Zhang, Ningbo (CN)

(73) Assignee: NINGBO SHANGJIN AUTOMATION TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/079,879

(22) Filed: Dec. 13, 2022

(65) Prior Publication Data
US 2024/0191831 A1  Jun. 13, 2024

(51) Int. Cl.
| F16M 11/20 | (2006.01) |
| F16M 11/04 | (2006.01) |
| F16M 11/18 | (2006.01) |
| F16M 11/22 | (2006.01) |

(52) U.S. Cl.
CPC ....... *F16M 11/2085* (2013.01); *F16M 11/046* (2013.01); *F16M 11/18* (2013.01); *F16M 11/2092* (2013.01); *F16M 11/22* (2013.01)

(58) Field of Classification Search
CPC ............. F16M 11/2085; F16M 11/046; F16M 11/2092; B60N 2/067
See application file for complete search history.

(56) References Cited

U.S. PATENT DOCUMENTS

| 3,155,383 | A | * | 11/1964 | Whitmore | .......... | F16M 11/2085 |
| | | | | | | 384/100 |
| 6,077,078 | A | * | 6/2000 | Alet | ...................... | F16M 11/18 |
| | | | | | | 472/130 |
| 8,109,395 | B2 | * | 2/2012 | Gaunekar | .............. | B23Q 1/012 |
| | | | | | | 212/324 |
| 9,302,394 | B2 | * | 4/2016 | Heiniger | ................. | B23Q 1/012 |
| 10,018,988 | B2 | * | 7/2018 | Heiniger | .............. | G05B 19/402 |
| 10,883,652 | B2 | * | 1/2021 | Wang | ..................... | F16M 11/08 |
| 11,408,554 | B2 | * | 8/2022 | Ingram | ................ | G05B 19/402 |
| 11,466,809 | B2 | * | 10/2022 | Kobel | ................ | H01L 21/68764 |
| 2003/0077139 | A1 | * | 4/2003 | Chang | .................... | B25J 9/0042 |
| | | | | | | 409/211 |
| 2004/0172758 | A1 | * | 9/2004 | Alakkat | .................. | A61G 13/04 |
| | | | | | | 5/610 |
| 2006/0239677 | A1 | * | 10/2006 | Friedrich | ................ | F16M 11/08 |
| | | | | | | 396/419 |

(Continued)

*Primary Examiner* — Christopher Garft

(57) ABSTRACT

A gantry motion platform includes a base, a first transmission mechanism, a second transmission mechanism and a working platform. The first transmission mechanism is mounted on the base and includes two first sliding rails, at least one first sliding block, and a first driving member. The first driving member is mounted on the base and located at a center position between the two first sliding rails. The second transmission mechanism is mounted on the at least one first sliding block and capable of moving along a first direction under driving of the first driving member. The working platform is mounted on the second transmission mechanism and capable of moving along the second direction under driving of a second transmission mechanism, and an angle is defined between the first direction and the second direction.

5 Claims, 2 Drawing Sheets

(56) References Cited

U.S. PATENT DOCUMENTS

| | | | |
|---|---|---|---|
| 2013/0273477 A1* | 10/2013 | Morohashi | H01L 21/67742 269/60 |
| 2014/0291270 A1* | 10/2014 | Heiniger | B23Q 11/001 212/324 |
| 2016/0224008 A1* | 8/2016 | Heiniger | B23Q 1/626 |
| 2019/0063669 A1* | 2/2019 | Ingram | F16M 11/2092 |
| 2020/0011478 A1* | 1/2020 | Wang | F16M 11/08 |
| 2020/0200324 A1* | 6/2020 | Kobel | H01L 21/68764 |

\* cited by examiner

GANTRY MOTION PLATFORM

TECHNICAL FIELD

The present disclosure relates to a field of mechanical structure, and in particular, to a gantry motion platform.

BACKGROUND

A gantry motion platform is widely applied to various automation devices requiring movement. Generally, a movement journey of the gantry motion platform along a X-direction and a perpendicular Y-direction are particularly long and wide, and an usual structure of the gantry motion platform is designed as a X-direction motion mechanism moving across a Y-direction motion mechanism.

In the related art, there are usually two driving methods of the Y-direction motion of the gantry motion platform. One of the driving methods is Y-direction bilateral driving mode for a gantry, in which two linear motors and two linear encoders are provided, matching with a motion control algorithm to eliminate a coupling of the Y-direction motions on both sides of the gantry, so as to obtain better precision and speed. The other of the driving methods which is low-cost is to provide a dual ball screw driving device, that is, each of the Y-direction motions on both sides is driven by a ball screw. When one side of the gantry motion platform is driven by the ball screw along an axis, the other side of the gantry motion platform will follow. In addition, in a related structural design, two Y-direction driving devices can be connected by a timing belt to achieve the purpose of driving the two sides of the gantry motion platform synchronously.

SUMMARY

According to various embodiments of the present disclosure, a gantry motion includes a base, a first transmission mechanism, a second transmission mechanism and a working platform. The first transmission mechanism is mounted on the base, and the first transmission mechanism includes two first sliding rails, at least one first sliding block, and a first driving member. The two first sliding rails extend along a first direction and are mounted on the base at intervals in a second direction, the at least one first sliding block is slidably disposed on the two first sliding rails, and the first driving member is mounted on the base and located at a center position between the two first sliding rails. The second transmission mechanism is mounted on the at least one first sliding block and the first driving member is capable of driving the second transmission mechanism to move along the first direction. The working platform is mounted on the second transmission mechanism and the second transmission mechanism is capable of driving the working platform to move along the second direction, and an included angle is defined between the first direction and the second direction.

In an embodiment, the second transmission mechanism includes a support beam, a second sliding rail, a second sliding block, and a second driving member. The support beam is fixed to the first sliding block, and the first driving member is fixedly connected to the support beam, the second sliding rail is fixed to the support beam, the second sliding block is slidably connected to the second sliding rail, and the second driving member is fixed to the support beam and configured to drive the second sliding block to move along the second direction.

In an embodiment, the number of the first sliding block is at least one, the first sliding block is connected to the two first sliding rails, and the first driving member is fixedly connected to the first sliding block or the support beam.

In an embodiment, the number of the first sliding block is at least two, the two first sliding blocks are connected to the two first sliding rails respectively, and the first driving member is fixedly connected to the supporting beam.

In an embodiment, the first driving member includes a seat, a ball screw, a ball screw nut, and a driving source. The seat is disposed on the base, the driving source is in transmission connection with the ball screw nut and is configured for driving the ball screw nut to rotate, the ball screw nut is disposed on the seat and screwed to the ball screw, and the ball screw is fixed to the supporting beam of the second transmission mechanism and is parallel to the two first sliding rails, and when the screw nut rotates, the ball screw is driven to move along the first direction, so that the second transmission mechanism is capable of driving the working platform to move along the first direction.

In an embodiment, the first driving member is a ball screw transmission member.

In an embodiment, the second driving member is a pinion and gear transmission member or a belt transmission member.

In an embodiment, the driving source is fixed to the seat and capable of driving the ball screw nut to rotate synchronously through the driving assembly, and the driving assembly includes a driving pinion and a driven gear. The driving pinion is in transmission connection with an output shaft of the driving source, the driven gear and the driving pinion are engaged with each other, and the ball screw nut is connected to the driven gear, and the driven gear is capable of driving the ball screw nut to rotate synchronously.

In an embodiment, the base includes a platform and two support frames. The two supporting frames are erected at two ends of the platform, and the two first sliding rails are arranged on the two supporting frames respectively, so that a space is formed between the first transmission mechanism and the platform.

In an embodiment, the gantry motion platform further includes a third transmission mechanism, the third transmission mechanism is fixed on the second transmission mechanism, and the working platform is disposed on the third transmission mechanism. The third transmission mechanism is capable of moving along a third direction and driving the working platform to move in the third direction relative to the base, and the third direction is perpendicular to the first direction and the second direction respectively.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

To describe and illustrate embodiments and/or examples of the present disclosure made public here better, reference may be made to one or more of the figures. The additional details or embodiments used to describe the figures should not be construed as limiting the scope of any of the present disclosure, the embodiments and/or examples currently described, and the best model of the present disclosure as currently understood.

Figure 1:
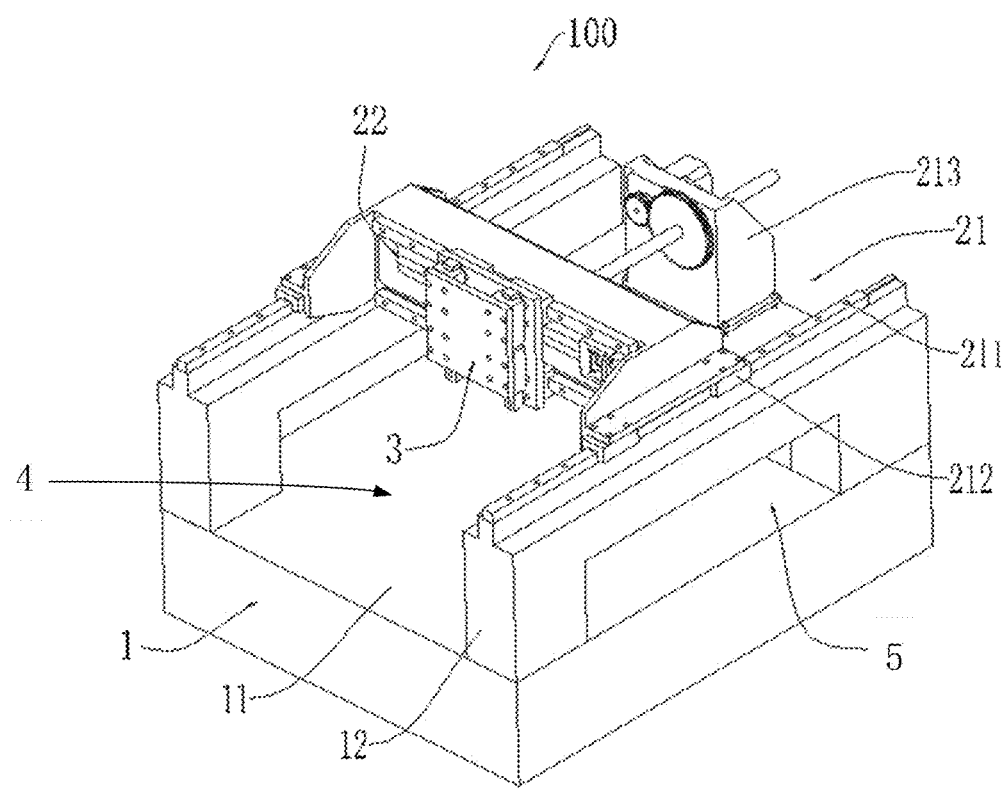
FIG. 1 is a structural schematic view of a gantry motion platform in one or more embodiments of the present disclosure.

In the figures, 100 represents a gantry motion platform, 1 represents a base, 11 represents a platform, 12 represents a support frame, 21 represents a first transmission mechanism, 211 represents a first sliding rail, 212 represents a first sliding block, 213 represents a first driving member, 2131 represents a seat, 2132 represents a ball screw, 2133 represents a ball screw nut, 2134 represents a driving source, 2135 represents a driving component, 2135A represents a driving pinion, 2135B represents a driven gear, 22 represents a second transmission mechanism, 221 represents a support beam, 222 represents a second sliding rail, 223 represents a second sliding block, 224 represents a second driving member, 23 represents a third transmission mechanism, 3 represents a working platform, 4 represents a space, and 5 represents an opening.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without making creative labor are the scope of the present disclosure.

In the description of the present disclosure, it should be understood that terms such as "center", "vertical", "horizontal", "length", "width", "thickness", "above", "below", "front", "back", "left", "right", "upright", "aclinic", "top", "bottom", "inner", "outer", "clockwise", "counterclockwise", "axial", "radial", "circumferential", etc. to instruct orientation or positional relationship is based on the orientation and positional relationship shown in the drawings, and is only for the convenience of describing the disclosure and simplifying the description, rather than instructing or implying that the device or element referred to must have a specific orientation or be constructed and operated in a specific orientation, so it should not be understood as limiting the specific protection scope of the disclosure.

In addition, the terms "first" and "second" are only used for descriptive purposes, and cannot be understood as indicating or implying relative importance or implying the number of indicated technical features. Thus, features delimited with "first", "second" may expressly or implicitly include at least one of the features. In the description of the present disclosure, unless expressly and specifically defined otherwise, "plurality" means at least two, such as two, three, etc.

In the present disclosure, unless clearly defined otherwise, the terms "install", "linked to", "connected to", and "fixed to" should be understood in a broad sense. For example, the connection includes a fixed connection, a detachable connection, or an integrated connection, it can be a mechanical connection, or an electrical connection, and it can be directly connected, or indirectly connected through an intermediate medium. And it can be internal communication between two components or interaction between two elements, unless expressly defined otherwise. For those of ordinary skill in the art, the specific meanings of the above terms in this disclosure can be understood according to specific situations.

In the present application, unless otherwise explicitly specified and defined, the expression a first feature being "on" or "underneath" a second feature may be the case that the first feature is in direct contact with the second feature, or the first feature is in indirect contact with the second feature via an intermediate medium. Furthermore, the expression the first feature being "over", "above" and "on top of" the second feature may be the case that the first feature is directly above or obliquely above the second feature, or only means that the level of the first feature is higher than that of the second feature. The expression the first feature being "under", "below" and "beneath" the second feature may be the case that the first feature is directly below or obliquely below the second feature, or only means that the level of the first feature is less than that of the second feature.

It should be noted that when an element is referred to as being "fixed to" or "disposed on" another element, it may be directly fixed to or disposed on the other element or a further element may be presented between them. When an element is considered to be "connected" to another element, it may be directly connected to the other element or connected to the other element through a further element. The terms "vertical", "horizontal", "upper", "lower", "left", "right" and similar expressions used in this application are for illustrative purposes only and are not intended to be the only implementation.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

Referring to FIG. 1 to FIG. 4, the present disclosure provides a gantry motion platform 100. The gantry motion platform 100 can be applied to various automation devices to meet actual multi-axis motion requirements. Specifically, the gantry motion platform 100 can be suitable for automation of device handling and hoisting processes in production and manufacturing, and building construction, thereby reducing manpower and production costs and improving work efficiency. In the present embodiment, the gantry motion platform 100 includes a base 1, a first transmission mechanism 21, a second transmission mechanism 22, and a working platform 3.

The base 1 is configured to carry and support the first transmission mechanism 21, the second transmission mechanism 22, and the working platform 3. The first transmission mechanism 21 and the second transmission mechanism 22 are mounted on the base 1. The working platform 3 is mounted on the second transmission mechanism 22 for carrying mobile devices, and the second transmission mechanism 22 and the first transmission mechanism 21 are configured for driving the working platform 3 to move along a second direction and a first direction relative to the base 1, respectively. It can be understood that structural setting and driving control can be performed by the second transmission mechanism 22 and the first transmission mechanism 21, so that dynamic performance such as motion range and motion precision of the working platform 3 can be adjusted.

In an embodiment, the base 1 includes a platform 11 and two support frames 12. Each of the two support frames 12 is a frame structure having an opening 5. The two supporting frames 12 can be erected at two ends of the platform 11, and two first sliding rails 211 of the first transmission mechanism 21 can be arranged on the two supporting frames 12 respectively, so that a space 4 can be formed between the first transmission mechanism 21 and the platform 11. In this way, it can facilitate installation and fixation of the first transmission mechanism 21 and the second transmission mechanism 22, and enough motion space can be provided for the working platform 3 to move along the second direction and the first direction relative to the base 1.

In related art, bilateral driving modes or unilateral driving modes can be adopted by a first transmission mechanism of a gantry motion platform. One of the bilateral driving modes is to provide two linear motors and two grating rulers matching with a motion control algorithm to eliminate a coupling of motions along the first direction on both sides of the gantry motion platform, so as to obtain better precision and speed. However, due to requirement of a plurality of sets of linear motors, grating rulers, additional reading heads and drivers, the cost is high. Another bilateral driving mode is a double-ball screw driving mode. When the motions along the first direction on both sides of the gantry motion platform are all driven by the ball screw, axial movements of the two sides cannot be synchronized due to processing or installation precision errors. In addition, due to the fact that a rigid connection is adopted in a transmission method of the double-ball screw driving mode, motion performance and motion precision of both sides of the gantry motion platform have a certain compromise. One of the unilateral driving modes is that one side of the gantry motion platform is driven by the ball screw along an axis thereof, and the other side of the gantry motion platform will follow. In this way, there is a greater force arm between a driving force along a first direction and a mass center of a second transmission mechanism of the gantry motion platform along a second direction, so that a large torque can be generated, causing the first transmission mechanism and the second transmission mechanism to twist. At the same time, one side of the first transmission mechanism with a motor can always drive the other side thereof without a motor to move, and when the motor changes a driving direction, there will be a high reversal error caused by a great sway error, that is, the other side of the first transmission mechanism without the motor remains stationary until the one side thereof with the motor is sufficient to drive it, which greatly affects precision and speed of the gantry motion platform. In addition, in a related structural design, two first direction driving devices can be connected by a synchronous belt to achieve the purpose of driving synchronously. In this way, problems in the above-mentioned driving modes may be partially improved, but final motion precision and dynamic performance of the gantry motion platform can be affected due to limitation of rigidity and mechanical precision of the synchronous belt.

Referring to FIG. 1 to FIG. 4, in the present embodiment, the first transmission mechanism 21 is mounted on the base 1, and the first transmission mechanism 21 includes two first sliding rails 211, at least one first sliding block 212, and a first driving member 213. The two first sliding rails 211 extend along the first direction and are mounted on the base 1 at intervals in the second direction, the at least one first sliding block 212 is slidably disposed on the two first sliding rails 211, and the first driving member 213 is mounted on the base 1 and located at a center position between the two first sliding rails 211. In some embodiments, the first driving member 213 can include a ball screw transmission member.

It can be understood that, in the present embodiment, the first driving member of the first transmission mechanism 21 is mounted on the base 1, and located at the center position between the two first sliding rails 211. Therefore, when the first transmission mechanism 21 drives the working platform 3 to move along the first direction relative to the base 1, a driving force along the first direction and a mass center of a load on the working platform 3 can be in one straight line, thereby solving the problem of uncoordinated movement of the two sides of the torque and the large span, so that its motion can be more stable, and the motion precision can be ensured.

Figure 2:
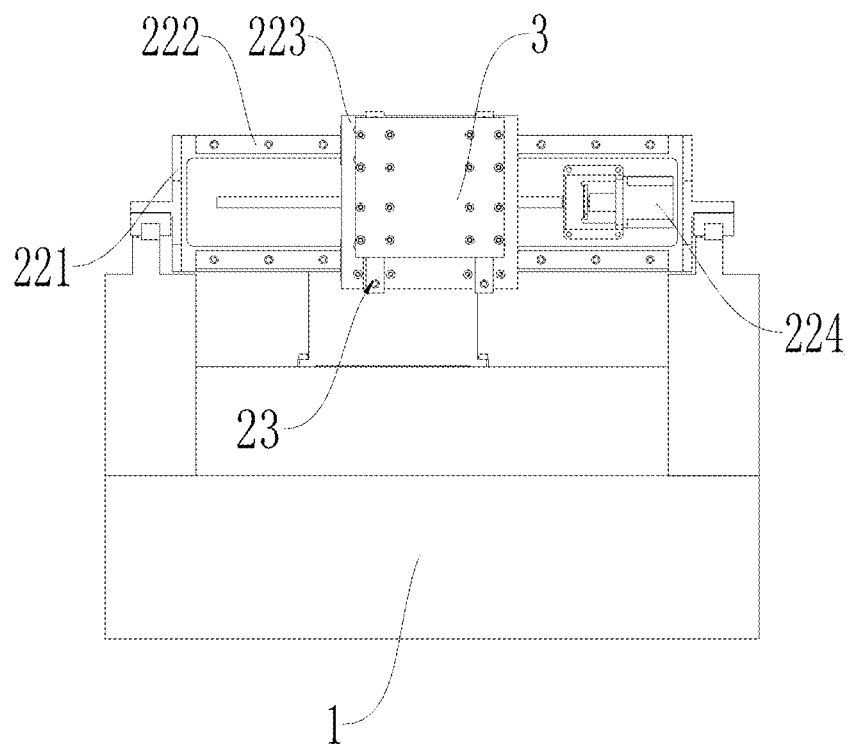
FIG. 2 is a front view of a gantry motion platform in one or more embodiments of the present disclosure.
Figure 3:
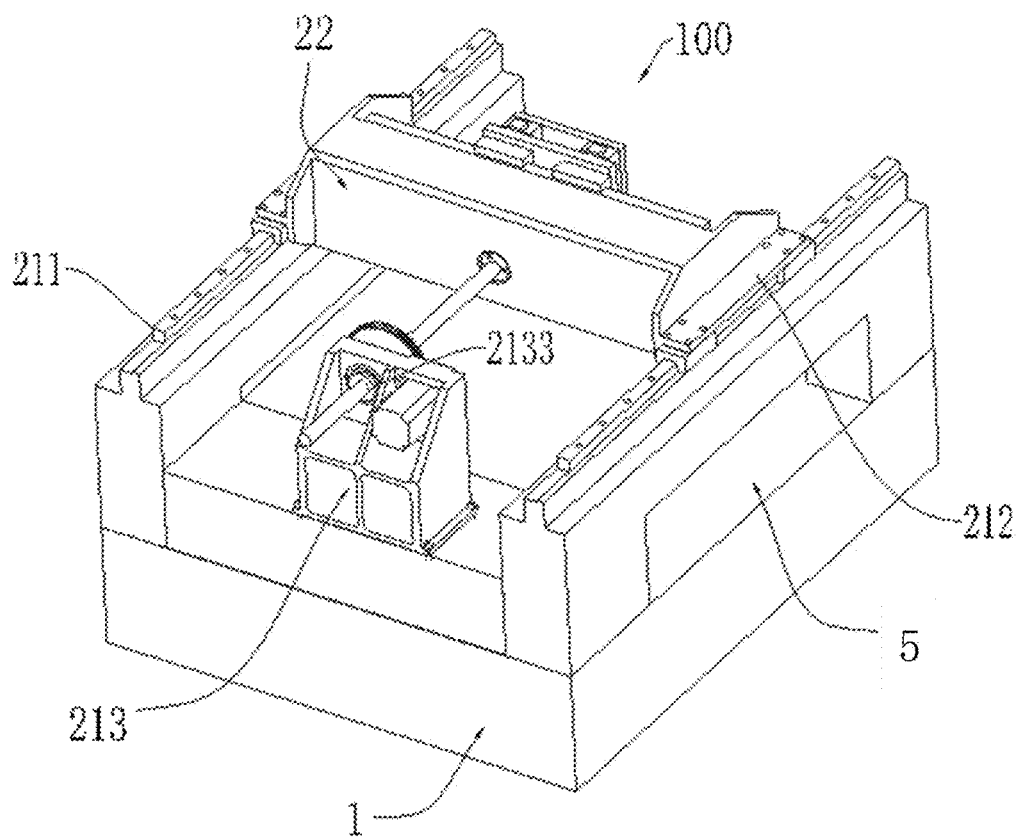
FIG. 3 is a structural schematic view of a gantry motion platform at another view angle in one or more embodiments of the present disclosure.

Referring to FIG. 2 and FIG. 3, the second transmission mechanism 22 is mounted on the at least one first sliding block 212 and capable of moving synchronously along the first direction with the first sliding block 212. In some embodiments, structures and transmission modes of the second transmission mechanism 22 and the first transmission mechanism 21 can be the same or different, and when the structures of the second transmission mechanism 22 and the first transmission mechanism 21 are the same, repair and replacement of components and parts thereof can be facilitated. In some embodiments, the second driving member 224 can include a pinion and gear transmission member or a belt transmission member. And the present disclosure is not limited herein.

In some embodiments, an included angle is defined between the first transmission mechanism 21 and the second transmission mechanism 22. In some embodiments, the included angle can be in a range of 0° to 90°, and alternatively, the included angle between the first transmission mechanism 21 and the second transmission mechanism 22 can be 90°.

In some embodiments, the second transmission mechanism 22 can include a support beam 221, a second sliding rail 222, a second sliding block 223, and a second driving member 224. The support beam 221 can be fixed to the first sliding block 212, and the first driving member 213 can be fixedly connected to the support beam 221. The second sliding rail 222 can be fixed to the support beam 221, the second sliding block 223 can be slidably connected to the second sliding rail 222, and the second driving member 224 can be fixed to the support beam 221 and configured to drive the second sliding block 223 to move along the second direction.

In this way, when the first driving member of the first transmission mechanism 21 is disposed on the base 1 and located at a center position between the two first sliding rails 211, the first driving member 213 can not be directly connected to the first sliding block 212, and the second transmission mechanism 22 fixed on the first sliding block 212 will be driven by the first driving member 213 to move. Alternatively, the first driving member 213 can be fixedly connected to a center of the support beam 221. In the present embodiment, the second transmission mechanism 22 can be provided with the support beam 221, and the first driving member 213 can be fixedly connected to the support beam 221, so that the support beam 221 can play a role of connecting the two first sliding blocks 212 to form an integrity structure, and meanwhile, support strength of the two first sliding blocks 212 can be improved. Therefore, when the first driving member drives the support beam 221 to move, the support beam 221 is fixed to the first sliding block 212, so the support beam 221 can drive the second transmission mechanism 22 on the first sliding block 212 to move along the first direction. In this way, a spatial layout of the first transmission mechanism 21 and the second transmission mechanism 22 can be more reasonable, the rigidity thereof can be stronger, and the motion thereof can be more stable.

It should be noted that, the support beam 221 can be a cross beam fixed to the first sliding block 212, the cross beam can be provided with an end face near the first driving member 213, and the end face can be provided with a fastening structure connected with the first driving member 213, so that the first driving member 213 can be connected and fixed to the fastening structure.

In some embodiments, the number of the at least one first sliding block 212 can be one, the single first sliding block 212 can be connected to the two first sliding rails 211, and the first sliding block 212 can be erected on the two first sliding rails 211. Alternatively, the first driving member 213 can be directly and fixedly connected to the first sliding block 212, and the first sliding block 212 can be driven directly to drive the second transmission mechanism 22 to move along the first direction. Alternatively, the support beam 221 of the second transmission mechanism 22 can be fixed to the first sliding block 212, and the first driving member 213 can be fixedly connected to the support beam 221 on the second transmission mechanism 22, so that the support beam 221 can be driven to drive the second transmission mechanism 22 on the first sliding block 212 to move along the first direction. And in this way, the first driving member 213 can be easy to assemble and be connected with the second transmission mechanism 22, thereby saving processing steps and costs.

In some embodiments, the number of the at least one first sliding block 212 can be two, the two first sliding blocks 212 can be connected to the two first sliding rails 211 respectively, and the first driving member 213 can be fixedly connected to the supporting beam 221. It can be understood that when the number of the at least one first sliding block 212 is two and the two first sliding blocks 212 are connected to the two first sliding rails 211 respectively, two ends of the support beam 221 on the second transmission mechanism 22 can be connected to the two first sliding blocks 212 respectively, so that the support beam 221 can be driven to drive the second transmission mechanism 22 on the first sliding block 212 to move along the first direction. And in this way, it is easy to disassemble and assemble the first driving member 213 and the second transmission mechanism 22, and facilitate maintenance.

Figure 4:
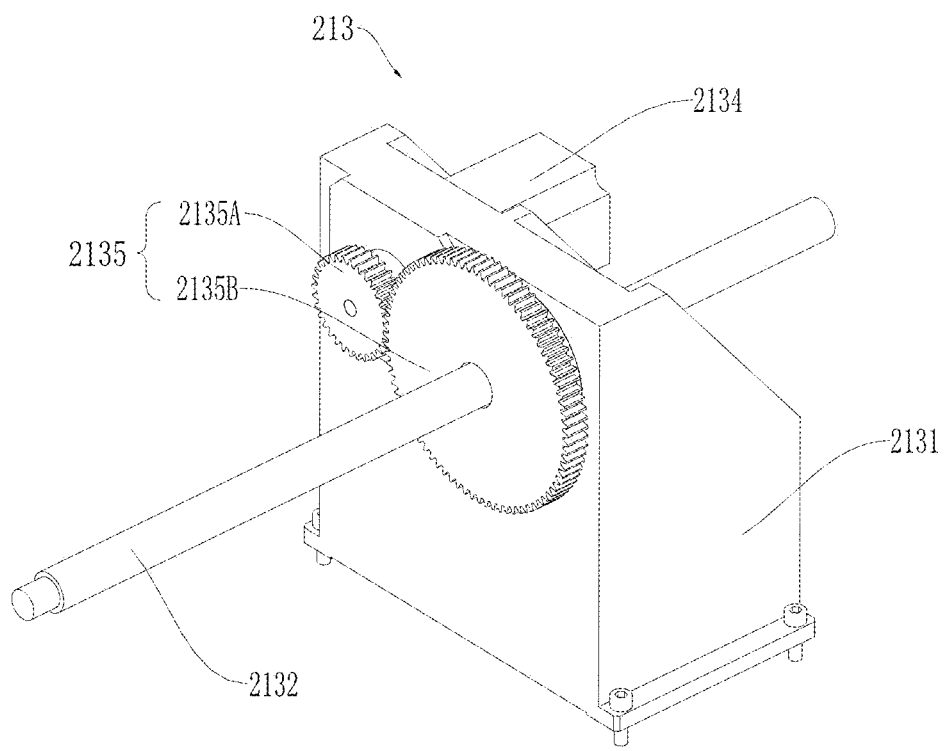
FIG. 4 is a structural schematic view of a first driving member of a gantry motion platform in one or more embodiments of the present disclosure.

Referring to FIG. 3 and FIG. 4, in some embodiments, the first driving member 213 can include a seat 2131, a ball screw 2132, a ball screw nut 2133, and a driving source 2134.

Specifically, the seat 2131 can be disposed on the base 1. Alternatively, in some embodiments, in order to improve driving stability, the seat 2131 can be fixed to the base 1 by welding or the like. In some other embodiments, the seat 2131 can be detachably fixed to the base 1 by means of threaded connection, catching manner, or the like, thereby facilitating later maintenance.

The driving source 2134 can be in transmission connection with the ball screw nut 2133 and configured for driving the ball screw nut 2133 to rotate, and the ball screw nut 2133 can be disposed on the seat 2131 and screwed to the ball screw 2132. The ball screw 2132 can be fixed to the supporting beam 221 of the second transmission mechanism 22 and parallel to the two first sliding rails 211, and the ball screw 2132 can be driven to move along the first direction when the ball screw nut 2133 rotates, so that the second transmission mechanism 22 is capable of driving the working platform 3 to move along the first direction.

In this way, when the first driving member 213 is in operation, the ball screw 2132 can be fixed without rotating, and the ball screw nut 2133 screwed to the ball screw 2132 can be driven to rotate by the driving source 2134, so that the ball screw 2132 can be driven to move along the first direction when the ball screw nut 2133 rotates. When the ball screw 2132 moves along the first direction, because the ball screw 2132 is fixed to the support beam 221 of the second transmission mechanism 22, the second transmission mechanism 22 can be driven to move along the first direction by the ball screw 2132, and the working platform 3 can be driven to move along the first direction by the second transmission mechanism 22. It can be understood that the ball screw 2132 is fixed without rotating when the first driving member 213 is in operation, so that connection stability of the first driving member 213 and the support beam 221 can be higher, and the overall support strength of the gantry motion platform 100 can be improved.

It should be noted that, in the present embodiment, the ball screw nut 2133 can be driven to rotate by the driving source 2134, and the ball screw nut 2133 and the driving source 2134 can be connected with each other by a gear rack transmission member or a synchronous toothed belt, which is not limited herein.

In some embodiments, the ball screw nut 2133 can be driven to rotate by the driving source 2134, and the ball screw nut 2133 and the driving source 2134 can be connected with each other by the gear rack transmission member. Specifically, the driving source 2134 can be fixed to the seat 2131, and drive the ball screw nut 2133 to rotate synchronously via the driving component 2135. The driving component 2135 can include a driving pinion 2135A and a driven gear 2135B, the driving pinion 2135A can be in transmission connection with an output shaft of the driving source 2134, and the driven gear 2135B and the driving pinion 2135A can be engaged with each other. The ball screw nut 2133 can be connected to the driven gear 2135B and driven by the driven gear 2135B to rotate synchronously. In this way, the gear rack transmission member is stable and reliable, and has greater transmission accuracy and bearing capacity. Therefore, heavier industrial devices can be supported on the working platform 3, and the gear rack transmission member has a longer service life.

In other embodiments, the ball screw nut 2133 can be driven to rotate by the driving source 2134, and the ball screw nut 2133 and the driving source 2134 can be connected with each other by the synchronous toothed belt. Specifically, the driving source 2134 can be fixed to the seat 2131, and drive the ball screw nut 2133 to rotate synchronously via the driving component 2135. The driving component 2135 can include a driving pulley, a driven pulley and a synchronous belt. The driving pulley can be in transmission connection with the output shaft of the driving source 2134, the synchronous belt can be sheathed on an outside of both the driving pulley and the driven pulley, and the ball screw nut 2133 can be connected to the driven pulley, and driven to rotate synchronously by the driving pulley. In this way, transmission efficiency and transmission range can be improved, maintenance can be facilitated, and operating cost can be reduced.

In some embodiments, the gantry motion platform 100 can further include a third transmission mechanism 23, the third transmission mechanism 23 can be fixed on the second transmission mechanism 22, and the working platform 3 can be disposed on the third transmission mechanism 23. The third transmission mechanism 23 can be capable of moving along a third direction and driving the working platform 3 to move along the third direction relative to the base 1, and the third direction is perpendicular to the first direction and the second direction respectively. It can be understood that the third transmission mechanism 23 can be provided on the second transmission mechanism 22, so that flexibility and operation freedom of the gantry motion platform can be further improved to meet actual application requirements of the multi-axis motion.

It can be understood that structures and a transmission methods of the third transmission mechanism 23 and the second transmission mechanism 22 can be the same or different and the third transmission mechanism 23 can be the pinion and gear transmission member or the belt transmission member, the present disclosure is not limited herein.

In the present embodiment, an industrial device can be further provided. The industrial device can include the gantry motion platform 100 as described above. In this way, the gantry motion platform 100 can be applied in the industrial device to improve stability and efficiency of the operation, so as to further improve motion performance and operation precision of the industrial device.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

It should be appreciated by those skilled in the art that the above embodiments are merely illustrative of the disclosure and are not intended to be limiting of the disclosure, and variations and modifications without departing from the spirit and scope of the disclosure fall within the scope of the present disclosure.

We claim:

1. A gantry motion platform, comprising:
   a base;
   a first transmission mechanism mounted on the base, wherein the first transmission mechanism comprises two first sliding rails, at least one first sliding block, and a first driving member, and the two first sliding rails extend along a first direction and are mounted on the base at intervals in a second direction, the at least one first sliding block is slidably disposed on the two first sliding rails;
   a second transmission mechanism mounted on the at least one first sliding block, the first driving member being capable of driving the second transmission mechanism to move along the first direction; and
   a working platform mounted on the second transmission mechanism, the second transmission mechanism being capable of driving the working platform to move along the second direction,
   wherein an included angle is defined between the first direction and the second direction,
   the second transmission mechanism comprises a support beam, a second sliding rail, a second sliding block, and a second driving member;
   the support beam is fixed to the first sliding block;
   the second sliding rail is fixed to the support beam;
   the second sliding block is slidably connected to the second sliding rail; and
   the second driving member is fixed to the support beam and configured to drive the second sliding block to move along the second direction,
   wherein the first driving member comprises a seat, a ball screw, a ball screw nut, and a driving source; the seat is directly disposed on the base and located at a center position between the two first sliding rails; the driving source is in transmission connection with the ball screw nut and is configured for driving the ball screw nut to rotate; the ball screw nut is disposed on the seat and screwed to one end of the ball screw; another end of the ball screw is directly connected and directly fixed to the supporting beam of the second transmission mechanism, the ball screw is parallel to the two first sliding rails, and when the screw nut rotates, the ball screw is driven to move along the first direction, so as to drive the working platform to move along the first direction;
   the base comprises a platform and two support frames, each of the two support frames is a frame structure having an opening;
   the two supporting frames are erected at two ends of the platform, and the two first sliding rails are arranged on the two supporting frames respectively, so that a space is formed between the first transmission mechanism and the platform.

2. The gantry motion platform of claim 1, wherein the number of the at least one first sliding block is two, the two first sliding blocks are connected to the two first sliding rails respectively, and the first driving member is fixedly connected to the supporting beam.

3. The gantry motion platform of claim 1, wherein the driving source is fixed to the seat and capable of driving the ball screw nut to rotate synchronously through a driving assembly, wherein the driving assembly comprises a driving pinion and a driven gear;
   the driving pinion is in transmission connection with an output shaft of the driving source;
   the driven gear and the driving pinion are engaged with each other; and
   the ball screw nut is connected to the driven gear, and the driven gear is capable of driving the ball screw nut to rotate synchronously.

4. The gantry motion platform of claim 1, wherein the second driving member is a pinion and gear transmission member or a belt transmission member.

5. The gantry motion platform of claim 1, further comprising a third transmission mechanism, wherein the third transmission mechanism is fixed on the second transmission mechanism, and the working platform is disposed on the third transmission mechanism; and
   the third transmission mechanism is capable of moving along a third direction and driving the working platform to move along the third direction relative to the base, and the third direction is perpendicular to both the first direction and the second direction.

* * * * *